United States Patent

Martinsen

[11] Patent Number: 6,071,420
[45] Date of Patent: Jun. 6, 2000

[54] METHOD AND APPARATUS FOR SEPARATION OF OIL AND WATER

[76] Inventor: Harold A. Martinsen, Kongsmyrveien 10a, N-5070 Mathopen, Norway

[21] Appl. No.: 09/155,223
[22] PCT Filed: Mar. 26, 1997
[86] PCT No.: PCT/NO97/00085
 § 371 Date: Sep. 24, 1998
 § 102(e) Date: Sep. 24, 1998
[87] PCT Pub. No.: WO97/35653
 PCT Pub. Date: Oct. 2, 1997

[30] Foreign Application Priority Data

Mar. 27, 1996 [NO] Norway ................................. 961235

[51] Int. Cl.[7] .................................................. B01D 17/02
[52] U.S. Cl. .................... 210/774; 210/800; 210/801; 210/805; 210/320; 210/187; 210/175; 210/519; 210/532.1; 210/538; 210/540
[58] Field of Search ..................... 210/800, 801, 210/774, 775, 175, 176, 187, 513, 532.1, 538, 922, 923, 805, 320, 519, 540

[56] References Cited

U.S. PATENT DOCUMENTS

| | | | |
|---|---|---|---|
| 1,170,558 | 2/1916 | Nonnenbruch | 210/800 |
| 1,326,039 | 12/1919 | Dunwody | 210/800 |
| 1,660,235 | 2/1928 | Pierce | 210/800 |
| 2,767,848 | 10/1956 | Beckett | 210/800 |
| 2,986,279 | 5/1961 | Henigman | 210/800 |
| 3,282,425 | 11/1966 | Christiani | 210/800 |
| 4,594,155 | 6/1986 | Conway | 210/115 |

FOREIGN PATENT DOCUMENTS 396 751  11/1993  Austria .
0 092 432 A2  10/1983  European Pat. Off. .

*Primary Examiner*—Robert J. Popovics
*Attorney, Agent, or Firm*—Barry R. Lipsitz; Ralph F. Hoppin

[57] ABSTRACT

There is described a method for the separation of liquids of different densities that are not soluble in one another, such as water and oil, where a liquid mixture is placed in a tank in which heat is optionally supplied to the liquid mixture, and separation occurs as the liquid having the highest density sinks toward the bottom of the tank and forms a layer (a) where it may be tapped off, and the liquid having the lowest density rises and forms a layer (c) at the top of the tank (1), and that between the separated liquids is a mixed layer (b) comprising a mixture of the liquids, where the liquid mixture to be separated is fed into the tank in a manner generating the least possible vertical liquid flow, and where the liquid mixture is fed into the tank through one or more outlets that are disposed in a closed-off section of the tank. Also described is an apparatus for carrying out the method.

31 Claims, 8 Drawing Sheets

METHOD AND APPARATUS FOR SEPARATION OF OIL AND WATER

BACKGROUND OF THE INVENTION

The present invention relates to a method for separation of water and oil or water and liquid that is not soluble in water, and to an apparatus for carrying out the method.

Oil, such as fuel oil, propellants like bunker oil from ships, return oil and waste oil, often contains large quantities of water. A load of waste oil, for example, often contains water in the amount of 95% or more, in addition to a number of particles that are generally found in the water. The return oil may be sold with concession from SFT (Statens Forurensingstilsyn [National Pollution Control Authority]) to special receivers who use it as a replacement for heating oil. These recipients have, however, set a maximum limit of 5% (in certain cases 10%) of water in the oil. In the meantime, the oil having a higher water content has little economic value, but can constitute a major environmental problem. The water content therefore must be reduced.

When bunker oil for ships is received, it also often contains excessively large quantities of water, in certain cases more than 5–10%. This water may create problems during the operation of the ship and must therefore be separated out from the bunker oil. First, with some types of oil it may be very difficult to separate out the water with the equipment available on board. Moreover, the customer is probably not interested in this water, which again produces an environmental problem since it will always be contaminated to some degree by oil.

Oil products and water normally have different densities, with the oil normally having a density lower than that of the water. Water and oil can create relatively stable emulsions, however, where small water drops are dispersed in oil, or where small oil drops are dispersed in water. These emulsions are often very difficult to separate, not least when the oil phase is relatively high-molecular and viscous at the temperature of the mixture.

There are known a majority of methods for separating oil and water that are based on this density difference. The simplest apparatus of this type is a tank where water and oil, after standing for a relatively long period of time, are separated into a water phase at the bottom of the tank and an oil phase at the top. Between these two "pure" phases will be a layer that does not lend itself to separation, consisting of water in oil or oil in water, the so-called "interface." Some of the lighter components in the oil are easily separated from water by this means, while some of the heavier and/or polar components cannot be separated from the water, with the result that this interface constitutes the major portion of the volume of the tank, even after a prolonged period. This interface is not a homogeneous mixture, either, but it will also adjust itself here so that the lightest oils containing the least water are on the top, while the heaviest oils and the mixture having the highest water content settle near the bottom. This solution thus requires large tanks, takes a long time, and provides for an inadequate separation of water and some of the components of the oil.

By heating the contents of the tank, however, the density difference between the water and oil is increased, and with increased temperature are also increasingly heavier components likely to separate from the water. The heat in such tanks is supplied by heating elements warmed by hot water, steam or electrical heating elements at the bottom of the tank, or the tank may be heated by means of a heating jacket surrounding all or parts of the tank.

Oil is difficult to heat by means of such heating elements, however, and when electrical heating or steam is used, some heat degradation and carbonization of oil products on the heating elements occurs, making the transfer of heat even less satisfactory. Moreover, this type of heating process will generate currents of heated water and oil that will rise within the tank, while cold components will sink, thereby creating eddies which will work against the separation of the phases. In practice, therefore, such tanks prove to be unsatisfactory for most practical applications since the energy consumption involved in the heating is high and the separation is inadequate.

Particularly for relatively homogeneous, light oil fractions, this type of separation tank may provide for satisfactory separation. Waste oil delivered to a separation facility, however, is a broad-ranged product involving everything from lubricating oils and other heavier oil products to light petroleum products. In addition, the developments of recent years in refinery technology, including cracking and reforming of oil, have had the result that diesel and bunker oil for ships have also become very wide-ranged products containing a large number of chemical compounds. Some of the products formed by these processes also produce compounds having a higher water solubility than linear hydrocarbons.

The more environmentally friendly detergents of today have a higher density than earlier detergents, with a density close to 1, which places even greater demands on the separator than before.

In addition, there have been a large number of additives, including emulsifiers, added to some of these oils found in waste oils, which complicates the separation of the water phase and the oil phase. Moreover, the oils are often pumped with centrifugal pumps whereby the long-chained molecules are stretched and aligned, and water is also dispersed very effectively in the oil. Both of these factors contribute toward increasing the difficulty of separating water and oil in receiving plants.

Thus, in attempts to separate an oil with the aid of a traditional tank, as mentioned above, some of the lighter products will be more readily separated from the remainder by virtue of the fact that they will rise upward. Moreover, after a period of sedimentation, it would be possible to draw off some of the water from the bottom of the tank. Remaining in the tank would then be a major share of the oil mixed with water. This frequently large proportion of the original volume would not lend itself to separation, even if the tank were to stand for several months.

To improve the separation in this type of sedimentation tank, there is described in DE 3114745C2 a facility where two sedimentation tanks are coupled in series, so that the lighter phase from the first tank runs over into a second tank, where a further separation takes place. The separation would be similar to that mentioned above. The lighter oil products are thus easy to separate out and may be purified relatively effectively, while for the mixture of components that are heavier and more difficult to separate, this type of apparatus would be burdened with disadvantages as described above.

WO 81/03434 describes another such apparatus comprising a tank, basically filled with water, in which are positioned one or more preferably tilted pipes, where a mixture of oil and water to be separated is introduced at a point some distance down in these pipes. The oil will then rise in the pipes to a point above the surface of the water, while the water in the mixture is separated out and sinks down toward the open bottom of the pipes and out into the water in the container. This construction makes it possible for the separated oil that rises to a certain height above the surface of the water to be tapped off directly. This apparatus, however, also suffers from the same problems as other such sedimentation solutions.

These sedimentation solutions are based on the model that, in such a tank containing water and oil, the oil will rise up and form an oil phase as the water sinks and forms a water phase, while between these phases will be an interface consisting partly of a mixture of the two phases. New measurements, however, have shown that the picture is considerably more complicated. Such a relatively thin interface separating two relatively pure phases is more a theoretical model than a practical reality, particularly with the newer broad-ranged oil products.

In practice, a light oil will basically separate from water at a temperature of about 5° C., while most components in a diesel oil will separate from water at a temperature range of from +5 to +15° C. Heavier oils, however, must be heated substantially in order to attain, if at all, some degree of separation of the phases. A broad-ranged return oil containing everything from light oils to heavy lubricating oils could not, in practice, be satisfactorily separated by means of these known solutions involving heating. Also, in buried tanks not provided with heating, the separation that occurs is in practice very unsatisfactory, even after a processing period of several months, since the temperature lies at between 0 and 5° C. for the major part of the year.

Moreover, a number of additional difficulties arise with regard to the heating of the tank. First, oil is very difficult to heat up, and in this type of tank having a relatively low heat surface in relation to its volume, it will be the water that is heated; the oil is heated only slightly. Measurements on such a tank of 150 m³, which is apparently in equilibrium, have shown that at a water temperature of about 70° C. at the bottom of the tank the temperature of the oil was 20–40° C. Moreover, the heat that is added produces a thermal convection, which is counteractive to the desire to separate the phases.

SUMMARY OF THE INVENTION

Thus, it is an objective of the present invention to provide a method for separating oil and water, where the aforementioned disadvantages are avoided.

This is solved according to the present invention by a method for the separation of liquids of different densities that are not soluble in one another, such as water and oil, for example, where a liquid mixture is placed in a tank in which heat is optionally supplied to the liquid mixture, and separation occurs as the liquid having the highest density sinks toward the bottom of the tank and forms a layer where it may be tapped off, and the liquid having the lowest density rises and forms a layer at the top of the tank, and that between the separated liquids is a mixed layer comprising a mixture of the liquids, where the liquid mixture to be separated is fed into the tank in a manner generating the least possible vertical liquid flow, and where the liquid mixture is fed into the tank through one or more outlets disposed in a closed-off section of the tank.

The liquid mixture is preferably heated so that all the components in the liquid mixture have approximately the same temperature before it is conducted into the separation device. This is done preferably by passing the liquid mixture through a long spiral tube that is heated by its surroundings, for example, by heated water.

It is also an objective to provide an apparatus for carrying out the process.

This is solved according to the invention by an apparatus for the separation of liquids of different densities that are not soluble in one another, such as water and oil, for example, where a liquid mixture is placed in a tank in which heat is supplied to the liquid mixture, and separation occurs as the liquid having the highest density sinks toward the bottom of the tank and forms a layer where it may be tapped off, and the liquid having the lowest density rises and forms a layer at the top of the tank, and that between the separated liquids is a mixed layer comprising a mixture of the liquids, and which also comprises a feed pipe for the liquid mixture having one or more outlets arranged such that they provide a substantially horizontal liquid flow, and where the outlets are disposed in a closed-off section of the tank.

The present method and apparatus for carrying out the method builds on the known principle that slightly miscible or immiscible liquids having different densities will separate when the lighter liquid floats up above the heavier liquid. When these liquids are oil and water, the water will sink toward the bottom and the oil will float up. The separation of the phases may be accelerated by the heating of the liquid mixture that does not more or less spontaneously separate on standing; and to accelerate this separation, the portion of the liquid mixture that is difficult to separate is heated up to promote the separation of the phases by breaking the weak bonds by which the mixture is maintained, reducing the viscosity of the liquid mixture and increasing the density differences between the liquids. The special solution described herein, however, provides for a much more effective and rapid separation of the phases than that attained by known methods. In particular, this solution exhibits advantages where water and relatively heavy oil are to be separated, or where the mixture also contains a number of emulsifiers.

The heating of the liquid mixture is done by removing from the tank a portion of the liquid mixture that is most difficult to separate and passing it through an external heating device which heats all the components in the mixture to approximately the same degree, as would a heater having a large surface. Preferably the heating device consists of a long, preferably helical tube with a smooth inner surface and having an external heating source, preferably water that surrounds the spiral. For optimal results the rate of flow of the liquid mixture through the heater is adapted such that the liquid mixture has an almost laminar flow through the tube. To increase the capacity in the heater, a plurality of tubes may be laid in parallel.

The temperature to which the liquid should be heated depends on the particular oils found in the mixture. The heavier the oil fractions contained in the mixture, the higher the temperature to which the mixture must be heated. For waste oil it may be preferable to heat the mixture to from 20 to 40° C.

After heating the liquid mixture is introduced into the tank at a slow rate and in a manner generating the least possible vertical movement of the liquid mixture in the tank. The heaviest liquid, in this case the water, will then immediately sink toward the bottom of the tank while the lightest liquid will rise toward the top of the tank so as to form clear layers of the purified phases. The two separated phases will spread out horizontally when they have found their density range. The liquid mixture that has not separated will also arrange itself according to its density between these pure phases.

It will not be possible to separate oil and water completely by means of the present apparatus. There will always remain a slight residue of oil in the water and of water in the oil.

Therefore, what is meant here by pure oil is oil that is pure enough to be sold as pure oil on the market. In practice, this would be oil containing less than 5% water.

The most important advantages of the present apparatus are that it makes possible a rapid and cost-effective separation of oil and water in order to produce a commercially marketable product, with a simpler and thereby more reasonable facility than the known heating or boiling tanks. Moreover, the separation takes place in the course of hours or days, depending on the size of the facility, as opposed to weeks or months for the known facilities. The purification plants may thus be built on a smaller scale than the existing plants.

BRIEF DESCRIPTION OF THE DRAWINGS

The present invention will now be described with reference to the appended figures, where.

DETAILED DESCRIPTION OF THE INVENTION

Embodiment Form 1

Figure 1:
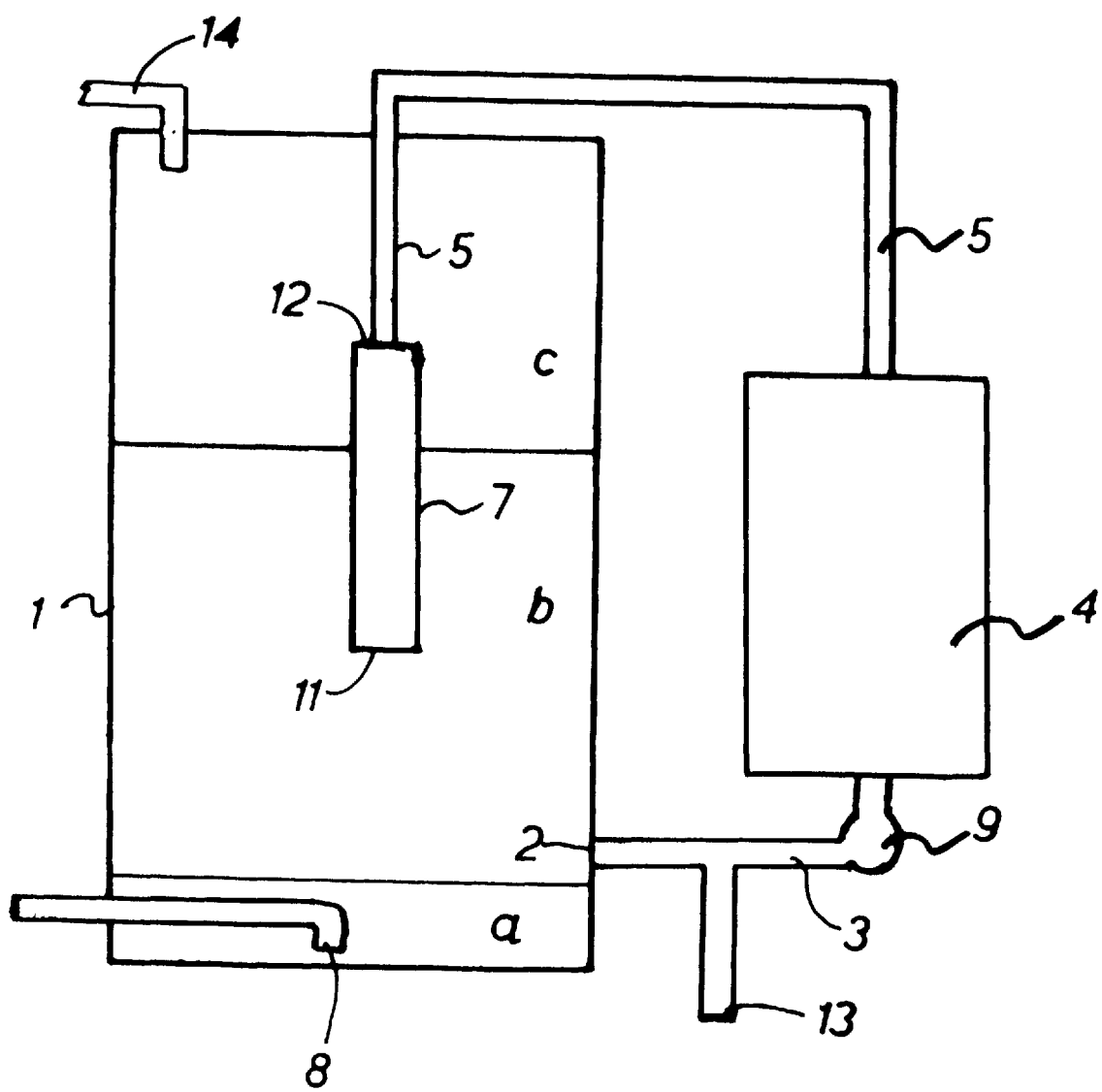
FIG. 1 is a schematic view of an embodiment form of the tank facility in accordance with the present invention.

The apparatus shown in FIG. 1 is typical for the purification of a bunker tank 1. When the tank 1 is filled, the separation can begin by passing out a portion of the mixture through an outlet 2 and through a drain pipe 3, which may be identical to the outlet pipe by which oil is normally discharged from the tank. The present invention may thereby be adapted to existing tank facilities without the necessity of major adjustment work.

The mixture extracted through outlet 2 is preferably conducted by means of a pump 9 through a heating unit 4 having a large surface toward all the components in the liquid mixture, which are heated to approximately the same degree. In the heating unit the liquid preferentially moves in an almost laminar flow through a long coil of tubes and is heated by the surroundings of the spiral tube, for example by hot water. The use of a tube having a relatively small diameter ensures a large surface in relation to the volume of flow. It has proven preferable that the diameter of the tube should be from about 10 to 22 mm, with about 16 mm being the particularly preferred size. The flow conditions in the tube coil in the heating unit limit the capacity of the heater. Turbulent flow will promote the maintenance of an emulsion and should therefore be avoided. Increasing the heater capacity may therefore be accomplished by laying a plurality of tube coils parallel to each other in the heating unit, or by laying two or more heaters in parallel.

The heated liquid mixture is then passed from the heating unit 4 through a feed pipe 5 to one or more supply port(s) 6 that are disposed within the tank. It is important that the supply ports 6 are designed to ensure a minimal eddy formation and horizontal motion within the liquid mixture. The supply ports 6 are disposed in an approximately vertically positioned pipe 7 having a considerably larger flow area than feed pipe 5. In addition, supply ports 6 are designed such that the liquid flowing out of the supply ports will flow almost horizontally out of the openings and form the least possible vertical currents. Pipe 7 is open at the bottom and the top and has a flow area that is preferably more than 10 times the flow area in feed pipe 5, and preferably less than 1000 times the flow area in the feed pipe 5. This brings about a corresponding reduction in the flow rate of the liquid mixture.

Figure 2:
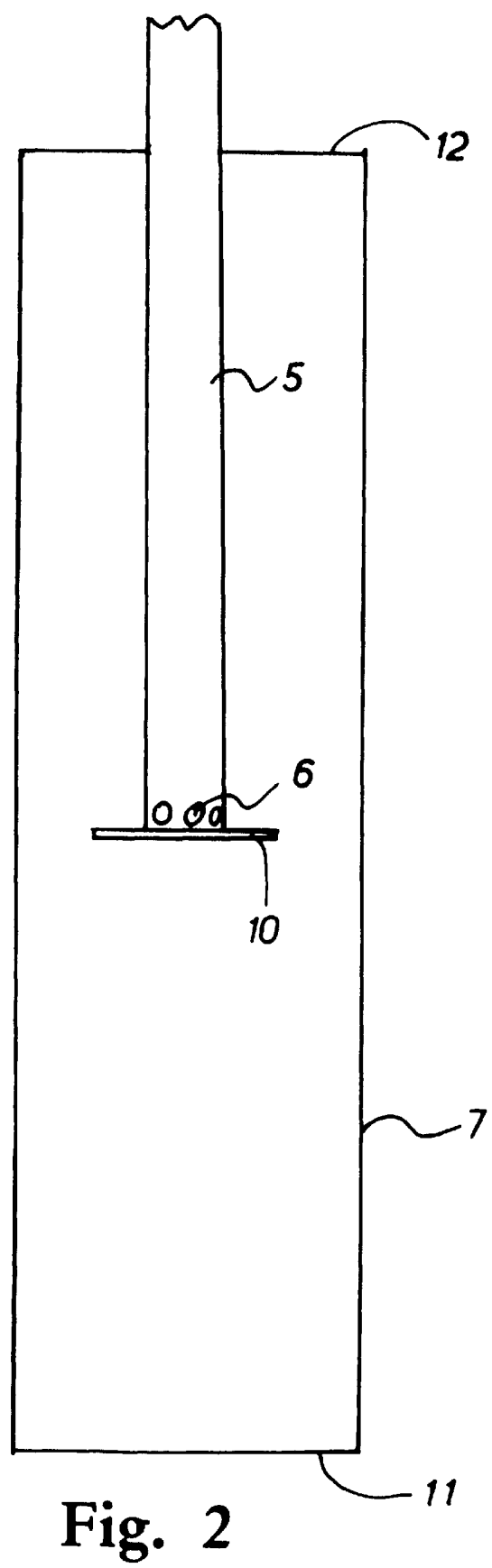
FIG. 2 is an enlarged, sectional view of the separation device in the tank in FIG. 1.

In the embodiment form shown on FIG. 2, a braking plate 10 is positioned at the lower end of feed pipe 5, and is designed to provide the liquid stream with approximately the same flow resistance downward in pipe 7 as upward.

Pipe 7 should be as long as is practically feasible. It has been shown in practice that a length of up to 80% of the height of the tank is favorable, with the upper and lower ends of the pipe being positioned an equal distance from, respectively, the bottom and top of the tank.

Immediately after the liquid mixture has emerged from supply port 6, the hot oil will rise to the top of the liquid, while the hot water will sink to the bottom of the tank and settle beneath the mixture of oil and water. Thus, at the bottom of the tank there will be formed relatively quickly a water layer a, which will also contain a number of other impurities in the form of particles and smaller amounts of oil having a particularly high density. Moreover, at the top of the tank will be formed an oil layer c, consisting of oil containing no water and particles. A mixed layer b, an area having a mixture of oil and water, will be found between water layer a and oil layer c.

As liquid mixture is continuously extracted at outlet 2 for heating, and the heated liquid mixture is fed to the tank through supply port 6 and is thereby substantially separated, the water layer a and the oil layer c will increase in thickness, while the mixed layer b is reduced. If there is a great deal of water in the liquid mixture, causing the water layer a to rise above a given height in the tank, the water and—with it—particles in the form of sludge, will be discharged through water discharge outlet 8. This mixture of sludge, water and smaller amounts of oil must then be disposed of in an environmentally responsible manner. One way of determining when it is time to empty the water is to monitor the water content in the liquid mixture that emerges through outlet 2. When the water content here increases and/or rises above a predetermined value, e.g., 50%, then either a predetermined amount of water is discharged, or the container is emptied until the water content at outlet 2 falls below a certain value and/or decreases. This liquid loss may then be replaced by extra liquid mixture introduced through feed pipe 13.

"Pure" oil may in addition be discharged through oil discharge outlet 14 near the top of the tank. Alternatively, "pure" oil may be removed from outlet 2 after the tank has been completely treated, i.e., when it contains only two layers, an oil layer and a water layer.

Figure 8:
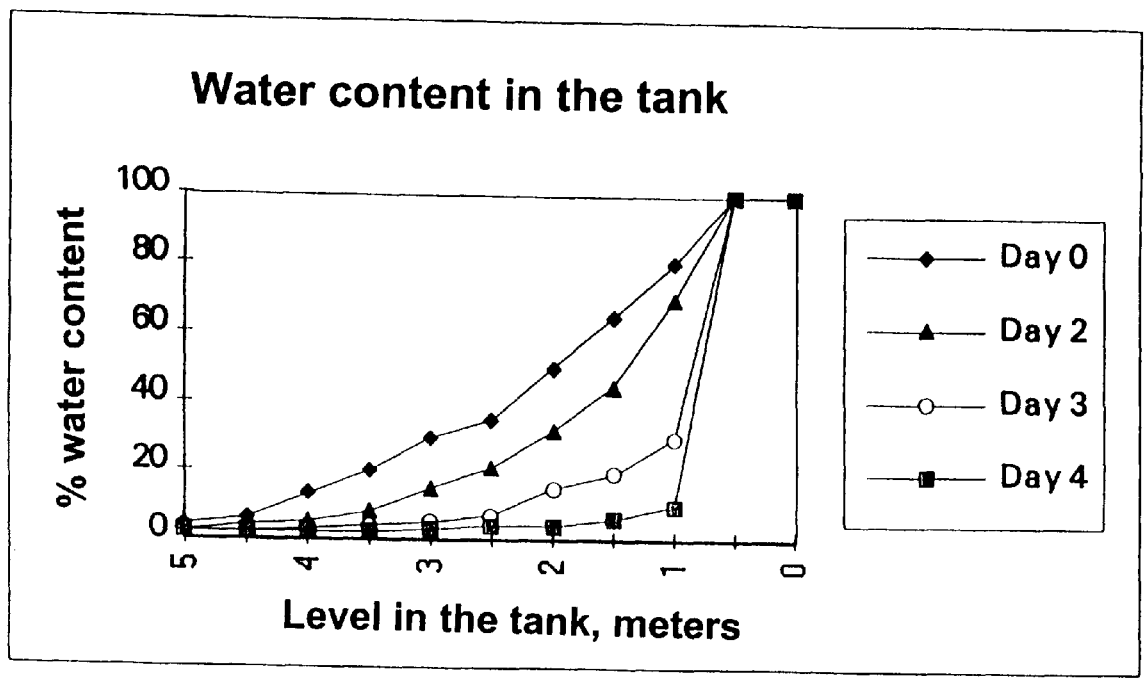
FIG. 8 is a typical situational graph of the relationship between oil and water, as a function of time, during separation in a tank facility according to FIG. 1.

As the treatment progresses, the thickness of mixed layer b decreases. FIG. 8 shows the water content in a typical tank as a function of the height of the tank. After receival of oil, it adjusts itself to a situation as shown in curve O, with water at the bottom and oil having a very slight water content at the top, and a gradual transition between these "pure" layers. The curves marked 1, 2 and 3 show the situation after, respectively, 1, 2 and 3 days' operation of the present apparatus. The level of the water layer is maintained at the same height by discharging water at the bottom of the tank. When the water content in the liquid is as for curve 3, has come below an acceptable level, and the water content in the liquid discharged through outlet 2 has fallen below a predetermined level, the treatment may be considered completed and may be terminated. It may be required or preferred, however, to initiate this heating and flowing process through the tank at certain intervals, for example once daily, in order to remove water formed by condensation, to remove water that has separated out while standing, and also to provide for some circulation of the tank, so that the content of the tank does not form layers consisting of oil of differing density.

The temperature to which the liquid mixture is heated in the heating device 4 may be varied as needed in the range of from 10° C. to 60° C. For relatively readily separable mixtures, heating to a range of 10° C. to 20° C. may be sufficient, while difficult to separate liquid mixtures having heavy oil and a high content of dispersants or the like may have to be heated in heating device 4 to the range of from 40° C. to 60° C. A frequently used temperature range would be from 20° C. to 40° C. Energy consumption for the heating process would be far lower, however, than for a "heating tank" where the temperature may be kept at up to 80° C. in the water phase, while the oil phase is from slightly above ambient temperature and up toward 30° C. to 60° C.

On ships during the cold seasons of the year the cooling of fuel in the tank might cause the fuel in all or parts of the tank to fall below the fuel's cloud point or the temperature where wax is precipitated as solid matter. If carried into the motor, these wax crystals may lead to clogging of nozzles, filters, etc. With automobile diesel, one attempts to avoid this problem by using winter fuel having a different composition than summer fuel.

After the wax crystals have been formed, it is often necessary to increase the temperature significantly before the crystals will dissolve again. The heat supplied in the present apparatus will prevent fuel in the tank from becoming as cold as the tank's surroundings and therefore reduce the formation of crystals. In addition, the heating in the heating device will return the wax to the oil phase.

Figure 3:
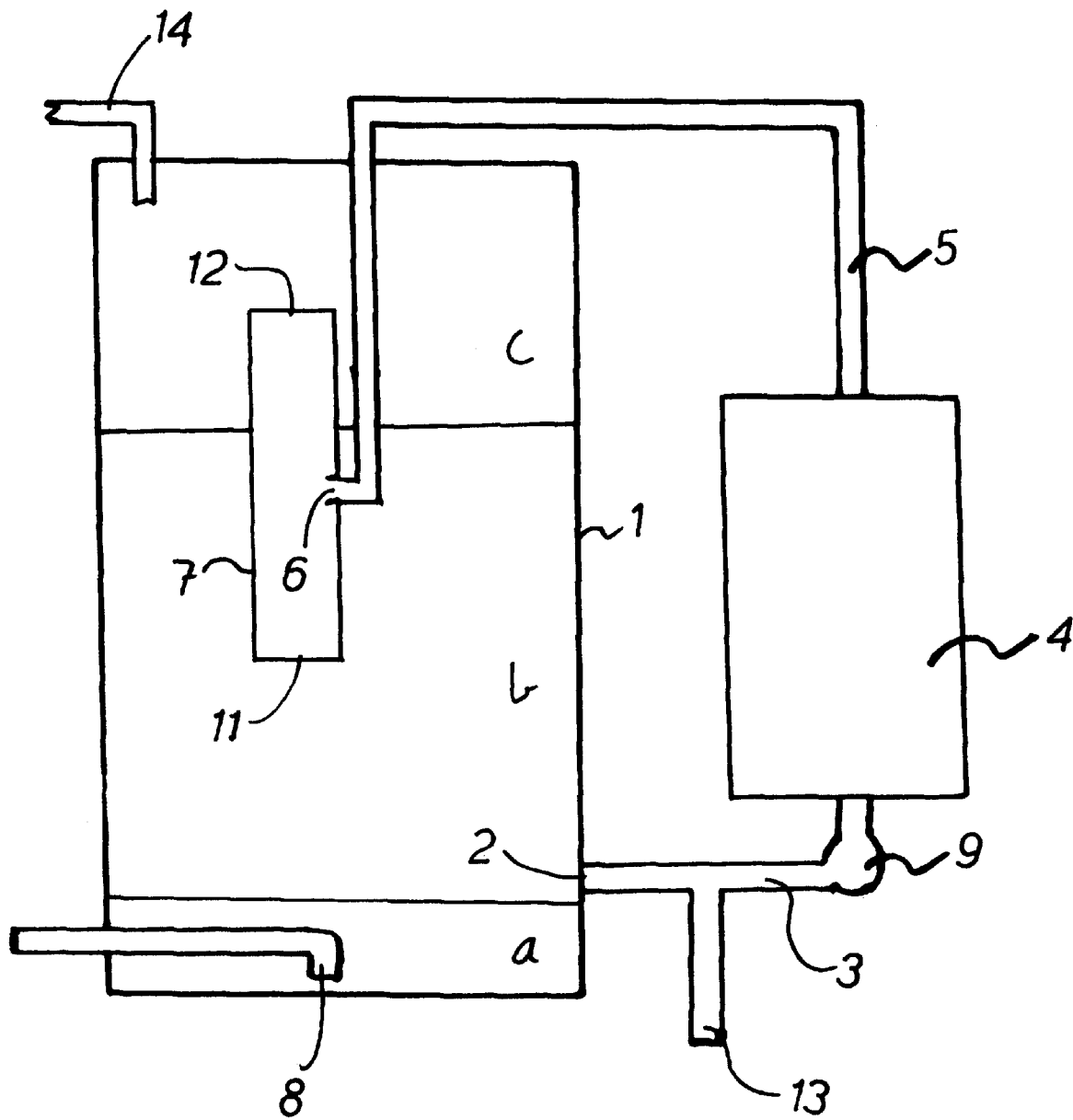
FIG. 3 is a view of the tank facility as in FIG. 1, but with an alternative embodiment form of the separation device.

The tank shown in FIGS. 1 and 3 may be an unmodified oil tank on land or on a boat. Water outlet 8 corresponds to the drain outlet normally found in such tanks. Outlet orifice 2 corresponds to the discharge opening found on such tanks for the removal of product, so that at these points it is unnecessary to modify or rebuild the existing tanks in order to put this into use. For feed pipe 5 with outlet port 6 and pipe 7, however, modifications would be necessary, entailing moderate costs.

Embodiment Form 2

Figure 4:
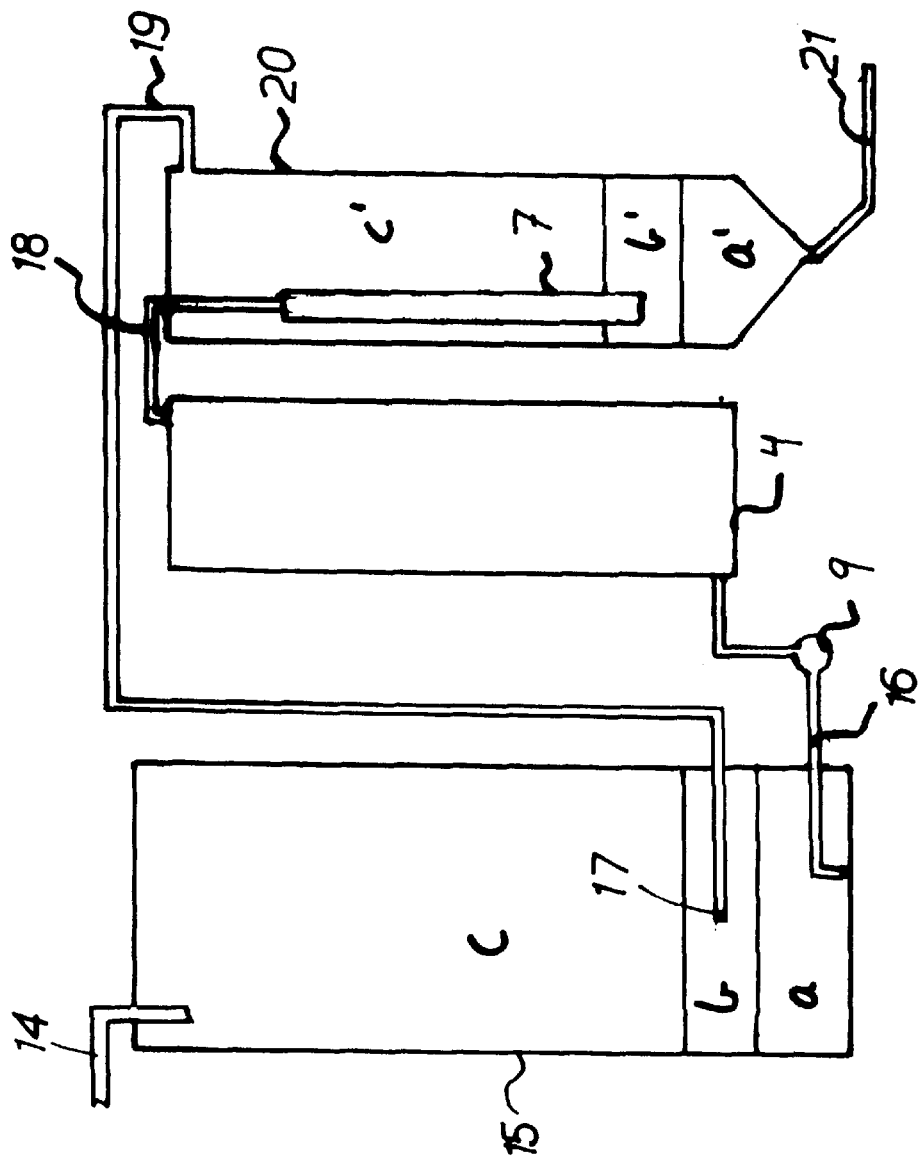
FIG. 4 is a view of an alternative embodiment form of the present invention.

FIG. 4 shows an embodiment form where an apparatus according to the present invention is arranged as a separate unit for the purification of the contents of an oil tank, such as a fuel tank, bunker tank, or the like. The oil or fuel is placed in a tank 15 in which a certain layer formation will occur, where water and some sludge will collect near the bottom of the tank in the area marked by a, while the lighter portions of the oil will collect at the upper part of the tank marked by c. Between these will be a relatively broad area containing a mixed phase marked b. This tank corresponds fully to a normal bunker tank. At the bottom of the tank is provided an discharge pipe 16, through which the heaviest phase in bunker tank 15 is pumped out with the aid of a pump 9 through the heating device 4, which is a tank filled with hot water, where the oil-mixed water is passed through a helical tube for heating, as for embodiment form 1.

From heating device 4 the hot oil/water mixture is conducted via feed pipe 18 down into the separation tank 20. Also in separation tank 20 there occurs a sedimentation of the heaviest phase, i.e., the water in the area marked a' at the bottom of the tank, while the light phase is found in area c', and between these is an area b' containing a mixture of oil and water constituting the interface between the water and oil. Here, however, layers will form in the same manner as in the tank shown in embodiment form 1, with sludge and water collecting in layer a' while pure oil is collected in layer c'. The heated oil and water mixture from heating device 4 is conducted down into the mixed area b', where it is introduced at such a slow rate that it generates only minimal currents in the tank and does not disturb the purer areas, c' and a', respectively.

In the embodiment form shown in FIG. 4, feed pipe 18 leads into tank 20, as it does in the other illustrated embodiment form, and has its outlet 6 in an outer pipe 7 which is open at both ends thereof, as shown in FIG. 2, with the upper end thereof being located slightly below the top of the separation tank and intended to brake the movement of the heated liquid in order to prevent the formation of eddies in tank 20.

After separation, the water and sludge may be tapped from separation tank 20 from the bottom thereof via discharge pipe 21, while the separated oil is conducted out through oil pipe 19 from the top of separation tank 20 and is reintroduced far down in bunker tank 15. This pure hot oil will then flow up through the mixed phase b, heating it up, and drawing with it some more pure oil toward the top layer, or oil layer c, in bunker tank 15.

In order to achieve an effective separation in separation tank 20, it is important for the mixed area b' in separation tank 20 to be set at the correct level. This is adjusted by regulating the tapping of the water and sludge through discharge pipe 21.

Since the heaviest contents in bunker tank 15 are continuously drawn out of the bunker tank and through the separation device, the contents of bunker tank 15 will be emptied of water, in addition to the fact that sludge will also be drawn off and separated in separation tank 20. Thus, after the water layer a has been removed from the bunker tank, the heaviest separable liquid mixture will be removed for separation. After bunkering, bunker tank 15 may thus be relatively rapidly emptied of water and particles. After the oil is completely purified, it may be necessary to reactivate the separation device at certain intervals, as water may have precipitated at the bottom of the tank and may not be readily separable, in addition to the fact that, after a certain period of time, condensation may form in the tank. This water will then be separated out. Moreover, after a period of standing, the oil's components will separate in the bunker tank so that the lighter portions lie near the top of the tank and the heavier portions lie near the tank's bottom. As a result, it may be impossible to have a homogeneous fuel available. Therefore, it is desirable to provide for some degree of stirring in the tank, which is accomplished by the fact that the hot, purified oil fed in through oil pipe 17 causes the formation of eddies in bunker tank 15, which ensures a certain degree of stirring of the contents.

Water and sludge emptied through discharge pipe 21 may still contain small amounts of oil or other materials that one would not want to release into nature. However, the collective waste here is considerably less than the waste generated by a conventional sedimentation tank.

Embodiment Form 3

Figure 5:
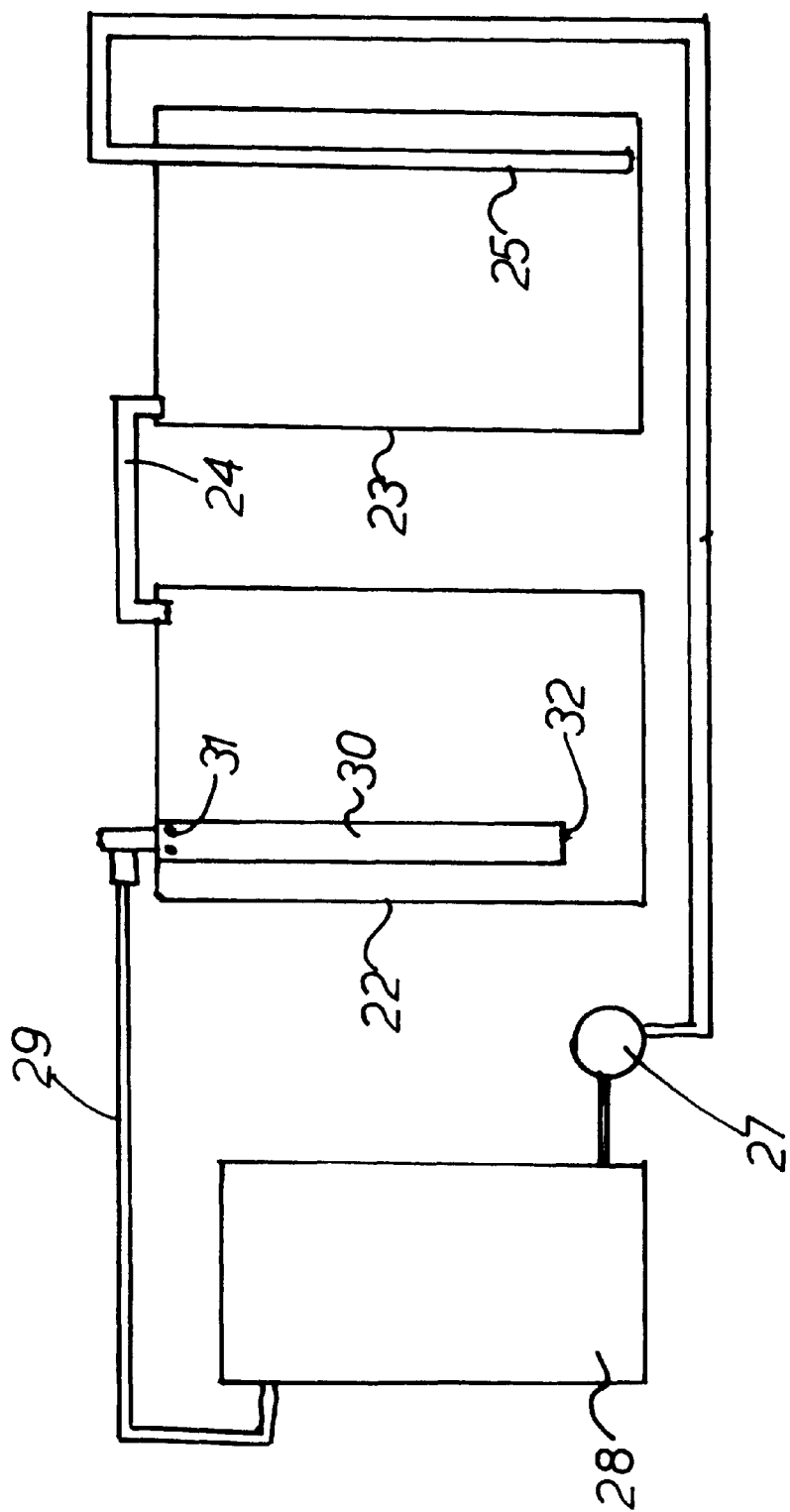
FIG. 5 is a view of a transportable system of the present invention.

To testing of the present invention and to use it with smaller quantities of oil, a small and simple system has been constructed, as shown in FIG. 5. This system comprises two tanks, a separation tank 22 and an oil tank 23, both of which optionally may be conventional oil drums having a height of about 90 cm, and, to start with, are both filled with the liquid mixture to be separated.

Figure 6:
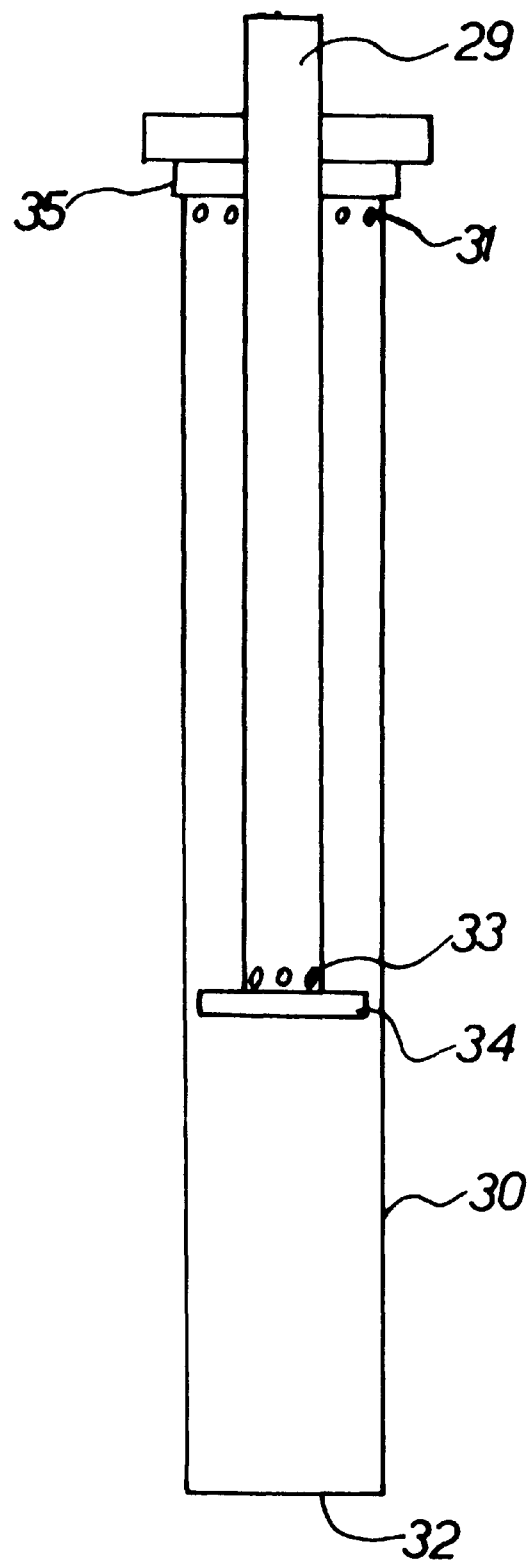
FIG. 6 is a view of an alternative embodiment form of a separation device adapted for connection to an oil drum.

In separation tank 22 there is mounted a separation device such as, for example, the one shown in FIG. 6. This separation device comprises an outer pipe 30 having a top with threads 35 adapted to the threads of a standard oil drum. The length of the outer pipe below the threaded top is about 70 cm, and the pipe's open bottom forms a lower outlet 32. About 4 cm from the top of outer pipe 30 are provided a plurality of upper outlets 31. Through the top 35 is positioned a feed pipe 29 which descends about 40 cm into the outer pipe. The lower end of feed pipe 29 is sealed, but near the bottom are radially disposed a plurality of outlets 33. To provide for a flow resistance that is the same both upward and downward in outer pipe 30, there may be mounted a braking disc 34 at the bottom of feed pipe 29.

From separation drum 22 is provided a transfer pipe 24 wherein liquid from the top of the separation drum is brought over into oil drum 23. A discharge pipe 25 from oil drum 23 leads into pump 27, which pumps liquid from the oil drum through a heating unit 28 and therefrom through feed pipe 29 down into the separation device in separation drum 22. In a preferred embodiment form, pump 27 is a gear pump. This type of pump will permit pumping of very viscous liquid and will also facilitate the further processing of the liquid by virtue of its mechanical effect on the liquid mixture.

In the separation device in separation drum 22 the liquid stream entering through feed pipe 29 will flow out into the outer pipe 30 through the radially disposed outlets 33, causing the liquid flow to be basically horizontal. The lighter oil here will rise toward the top and out through upper outlet 31, where it will settle as a layer at the top of the drum, while the water will sink downward and emerge out through lower outlet 32, where it will settle as a layer at the bottom of the drum.

Because it is the purest oil which is constantly extracted from the separation drum 22 and the heaviest fraction, i.e., the water and impure oil, which is removed from oil drum 23, the contents of oil drum 23 will become progressively purer oil, while the water layer in separation drum 22 will rise steadily higher. Oil drum 23 will finally contain almost pure oil, while separation drum 22 will contain, depending on the original water content of the mixture, a water layer situated at the bottom and a short distance upward in the drum, and a relatively pure oil layer on the top.

Figure 7:
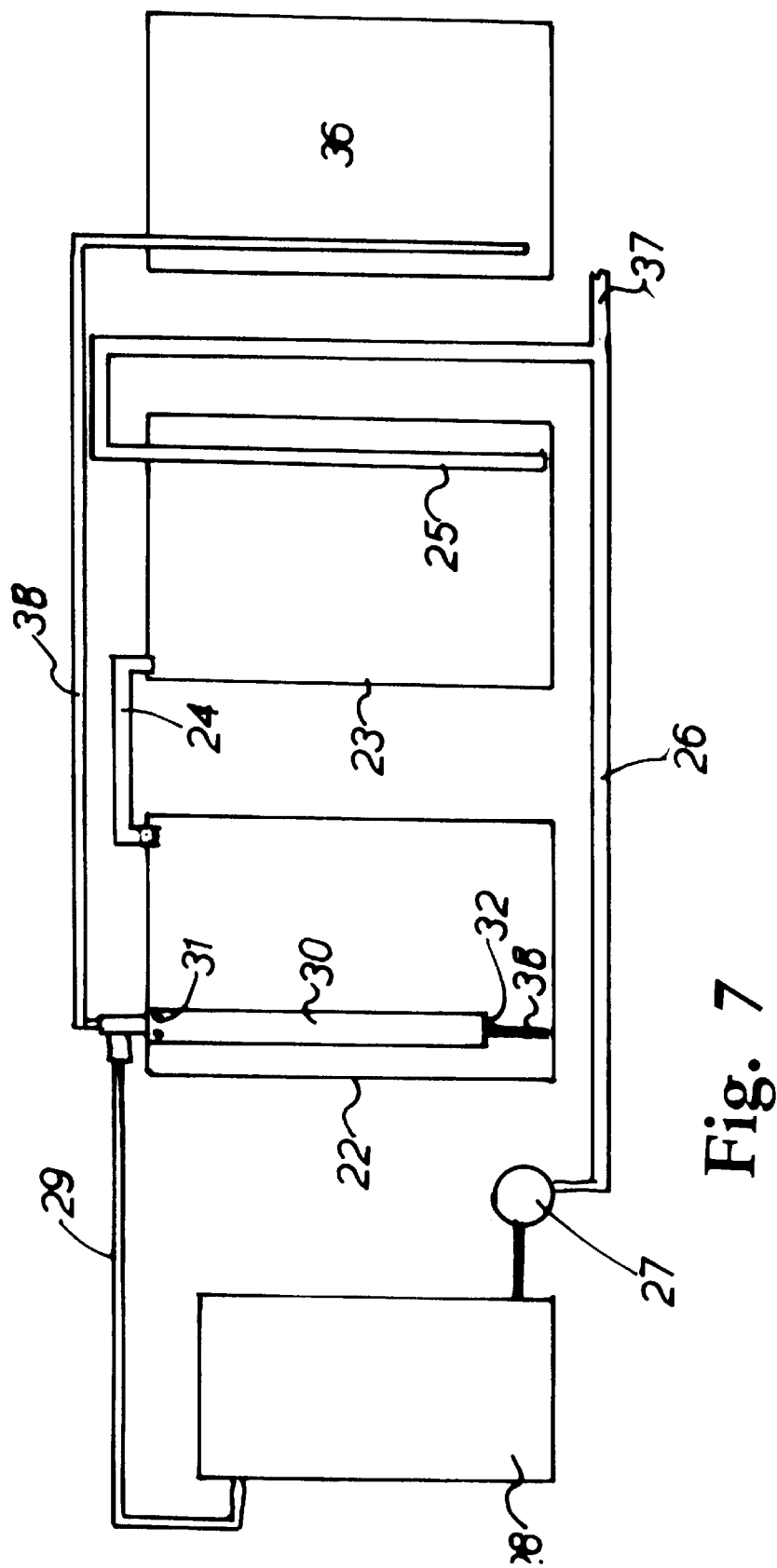
FIG. 7 is a view of an alternative embodiment form of the system shown on FIG. 5.

If desirable, this embodiment form may be adapted as shown in FIG. 7 by, for example, placing at the center of the separation device a water discharge pipe 38 from which water may be tapped from the bottom of separation tank 22 in order to be conducted to a water tank 36. New liquid mixture may optionally be introduced through feed pipe 37.

A unit as described above was used to test the system and to demonstrate the system's practical benefits. The tests were carried out at the areas of two different companies, one oil company and one user of return oil. The companies were responsible for the selection of oil and themselves tested the results afterwards.

For all three tests, both drums 22 and 23 were filled with a mixture of oil and water, as indicated below.

After the drums were filled, the circulation of the system was started and the liquid flowing through the heating unit was heated to about 40° C. After 3 to 4 hours of operation, the system was stopped and samples were taken of the oil phase.

TABLE 1

| Test no. | Oil type | Water content before purification | Water content after purification |
|---|---|---|---|
| 1 | Return oil from ships *) | >15% | 3.8% |
| 2 | Waste oil from oil separator | ~75% | 2.7% |
| 3 | Lubricating oil with water | ~15% | 1.33% |

*) Return oil that did not separate from the water after heating to 60° C. in a heating tank.

The oil which was previously a problematic waste for which it was necessary to pay to dispose of, had become a commodity having a market value (winter 1997) of about NOK 1000 per ton.

Calculations that have been done indicate, in addition, some major economic savings through this technology. The energy costs of separating a 50/50 mixture of oil and water are conservatively estimated at 75–57 øre per liter with a heating tank, depending on the ambient temperature. For a boiling tank the costs are estimated at about 75 øre per liter. For the present method the energy costs are estimated at about 2.5 Ɏre per liter, which calculations conform well with the tests of the system that have been carried out so far. The reason for this savings is basically the fact that it takes a shorter time to separate water and oil by means of the present invention than by the comparable solutions. Moreover, a lower temperature is used with the present solution than with the known solutions.

For the purpose of simplicity, tanks 1 and 15 in the figures shown are full. During operation, however, the situation would often be that the tank is not full, so that there is an area consisting of air at the top of the tank. This has no effect, however, on the principles explained and shown herein.

What is claimed is:

1. A method for separating first and second liquids from one another in a liquid mixture thereof, wherein the first and second liquids are not soluble in one another, and the first liquid has a higher density than the second liquid, comprising the steps of:

providing a liquid mixture of the first and second liquids in a first tank so that separation occurs as the first liquid sinks toward a bottom layer of the tank, and the second liquid rises toward a top layer of the tank, and a mixed layer comprising the liquid mixture forms in the tank intermediate to the top and bottom layers;

heating a liquid mixture of the first and second liquids in a heating device having a heated surface area;

feeding the heated liquid mixture into the mixed layer via a plurality of circumferentially arranged supply ports that are designed to supply the heated liquid mixture in an essentially horizontal flow in the mixed layer; and providing an essentially vertical wall surface for braking the horizontal movement of the heated liquid mixture; wherein:

the heated liquid mixture is fed into the mixed layer via an essentially vertical feed pipe coupled to the supply ports; and an essentially horizontal braking plate is arranged proximate to the supply ports.

2. The method of claim 1, comprising the further step of:

extracting a portion of the liquid mixture from the mixed layer to provide the liquid mixture for said heating step.

3. The method of claim 1, wherein:
the heated liquid mixture is fed into the mixed layer in a manner generating the least possible vertical liquid flow.

4. The method of claim 1, wherein:
the essentially vertical wall surface comprises an outer pipe arranged circumferentially about the supply ports and the feed pipe.

5. The method of claim 4, wherein:
the outer pipe is open at a bottom thereof to allow the heated first liquid of the heated liquid mixture to flow from the supply ports toward the bottom layer, and open at a top thereof to allow the heated second liquid of the heated liquid mixture to flow from the supply ports toward the top layer.

6. The method of claim 4, wherein:
the outer pipe has a flow area that is at least approximately 10 times a flow area of the feed pipe.

7. The method of claim 4, wherein:
the outer pipe has a flow area that is less than approximately 1000 times a flow area of the feed pipe.

8. The method of claim 1, wherein:
the heating device comprises a spiral heating element.

9. The method of claim 1, wherein:
in said heating step, the liquid mixture is heated to a temperature between approximately 10° C. and approximately 60° C.

10. The method of claim 1, wherein:
in said heating step, the liquid mixture is heated to a temperature between approximately 20° C. and approximately 40° C.

11. The method of claim 1, wherein:
the liquid mixture moves through the heating device in an almost laminar flow.

12. The method of claim 1, wherein:
the first liquid comprises water, and the second liquid comprises oil.

13. The method of claim 1, wherein the first tank is a separation tank, comprising the further steps of:
providing a bunker tank with a top layer, a bottom layer, and an intermediate mixed layer therebetween; and
extracting a portion of the liquid mixture from the bottom layer of the bunker tank to provide the liquid mixture for said heating step.

14. The method of claim 13, comprising the further step of:
transferring a portion of the second liquid from the top layer of the separation tank to the intermediate layer of the bunker tank.

15. The method of claim 1, wherein the first tank is a separation tank, comprising the further steps of:
providing an oil tank with a top layer, a bottom layer, and an intermediate mixed layer therebetween;
transferring a portion of the second liquid from the top layer of the separation tank to the top layer of the oil tank; and
extracting a portion of the liquid mixture from the bottom layer of the oil tank to provide the liquid mixture for said heating step.

16. An apparatus for separating first and second liquids from one another in a liquid mixture thereof, wherein the first and second liquids are not soluble in one another, and the first liquid has a higher density than the second liquid, comprising:

a first tank for holding the liquid mixture so that separation occurs as the first liquid sinks toward a bottom layer of the tank, and the second liquid rises toward a top layer of the tank, and a mixed layer comprising the liquid mixture forms in the tank intermediate to the top and bottom layers;

a heating device having a heated surface area for heating a liquid mixture of the first and second liquids;

a plurality of circumferentially arranged supply ports for feeding the heated liquid mixture into the mixed layer in an essentially horizontal flow therein;

an essentially vertical wall surface for braking the horizontal movement of the heated liquid mixture;

an essentially vertical feed pipe coupled to the supply ports for feeding the heated liquid mixture into the mixed layer; and an essentially horizontal braking plate arranged proximate to the supply ports.

17. The apparatus of claim 16, further comprising:
means for extracting a portion of the liquid mixture from the mixed layer to provide the liquid mixture for the heating device.

18. The apparatus of claim 16, wherein:
the heated liquid mixture is fed into the mixed layer in a manner generating the least possible vertical liquid flow.

19. The apparatus of claim 16, wherein:
the essentially vertical wall surface comprises an outer pipe arranged circumferentially about the supply ports and the feed pipe.

20. The apparatus of claim 19, wherein:
the outer pipe is open at a bottom thereof to allow the heated first liquid of the heated liquid mixture to flow from the supply ports toward the bottom layer, and open at a top thereof to allow the heated second liquid of the heated liquid mixture to flow from the supply ports toward the top layer.

21. The apparatus of claim 19, wherein:
the outer pipe has a flow area that is at least approximately 10 times a flow area of the feed pipe.

22. The apparatus of claim 19, wherein:
the outer pipe has a flow area that is less than approximately 1000 times a flow area of the feed pipe.

23. The apparatus of claim 16, wherein:
the heating device comprises a spiral heating element.

24. The apparatus of claim 16, wherein:
the heating device heats the liquid mixture to a temperature between approximately 10° C. and approximately 60° C.

25. The apparatus of claim 16, wherein:
the heating device heats the liquid mixture to a temperature between approximately 20° C. and approximately 40° C.

26. The apparatus of claim 16, wherein:
the liquid mixture moves through the heating device in an almost laminar flow.

27. The apparatus of claim 16, wherein:
the first liquid comprises water, and the second liquid comprises oil.

28. The apparatus of claim 16, wherein the first tank is a separation tank, further comprising:
a bunker tank with a top layer, a bottom layer, and an intermediate mixed layer therebetween; and means for extracting a portion of the liquid mixture from the bottom layer of the bunker tank to provide the liquid mixture for said heating device.

29. The apparatus of claim 28, further comprising:

means for transferring a portion of the second liquid from the top layer of the separation tank to the intermediate layer of the bunker tank.

30. The apparatus of claim 16, wherein the first tank is a separation tank, further comprising:

an oil tank with a top layer, a bottom layer, and an intermediate mixed layer therebetween;

means for transferring a portion of the second liquid from the top layer of the separation tank to the top layer of the oil tank; and means for extracting a portion of the liquid mixture from the bottom layer of the oil tank to provide the liquid mixture for said heating device.

31. The apparatus of claim 16, wherein said heating device is external to said tank.

* * * * *